United States Patent [19]
Shimura et al.

[11] 4,374,348
[45] Feb. 15, 1983

[54] WIPER DEVICE

[75] Inventors: Kiichiro Shimura, Tokyo; Takeo Tamura; Takayoshi Kido, both of Yokohama; Hiroshi Hara, Funabashi; Morimasa Tanaka, Atsugi, all of Japan

[73] Assignees: Nissan Motor Company, Limited, Kanagawa; Ichiko Industries Limited, Tokyo, both of Japan

[21] Appl. No.: 165,704

[22] Filed: Jul. 3, 1980

[30] Foreign Application Priority Data

Jul. 6, 1979 [JP] Japan .................................. 54-85091

[51] Int. Cl.³ ............................................... H02P 1/04
[52] U.S. Cl. .................... 318/443; 318/444; 318/DIG. 2; 15/250.12
[58] Field of Search ............... 318/443, 466, 467, 468, 318/282, 281, 266, 267, 256, 280, 444, DIG. 2; 15/250 B, 250.12, 250.16, 250.17

[56] References Cited

U.S. PATENT DOCUMENTS 2,913,754 11/1959 Vander Zee ...................... 15/250 B
3,568,024 3/1971 Robbins ........................... 318/280 X
3,689,817 9/1972 Elliott ................................ 318/443

FOREIGN PATENT DOCUMENTS 1440872 6/1976 United Kingdom .
2039084 7/1980 United Kingdom ................ 318/443

Primary Examiner—Ulysses Weldon
Attorney, Agent, or Firm—Lowe, King, Price & Becker

[57] ABSTRACT

A wiper device for wiping rain on a mirror surface of a rear-view mirror provided on the exterior of an automotive vehicle, includes a driving means of the wiper blade for driving the latter in first and second directions alternatively. The driving device comprises an electric circuit which includes a switching means and a means for detecting both ends of the wiper blade motions in the first and second directions. The switching means is operative to switch direction of an electric power supply to an electric motor when the detecting means detects the end of wiper blade motion.

10 Claims, 5 Drawing Figures

WIPER DEVICE

BACKGROUND OF THE INVENTION

The present invention relates generally to a wiper device of an automotive vehicle for wiping or cleaning rain from a glass surface, particularly from a rearview mirror, so called fender-mirror, provided externally of the vehicle body and protruding sidewardly therefrom.

Generally, the wiper device of the automotive vehicle is employed for wiping or cleaning away rain from front and rear windows. The conventional wiper device generally comprises a crank and link mechanisms for reversably and sectorially moving a wiper blade. The crank and link mechanisms convert rotational motion provided by an electric driving motor into reversing sectorial motion of the wiper blade. The wiper device has a means for positioning the wiper blade at a predetermined position on the window when it is no longer being driven. The means comprises a cam mechanism cooperably mounted on a driving shaft of the motor. The cam has a sliding contact in order to comprise an electric power generator control circuit.

On the other hand, since an external rear-view mirror is apt to provide a view of the rear side of the vehicle which is degraded or interrupted by rain accumulating thereon, there have been developed various wiper devices for wiping away the rain from the mirror surface. However, there is substantially only a small space in a mirror casing, so that it may not receive a driving means for reversably moving the wiper blade and for positioning the blade at the predetermined position such as used in the wiper device of the front and rear vehicle windows.

In this connection, it has been required to provide a wiper blade driving means which is small enough to be received within the mirror casing.

SUMMARY OF THE INVENTION

Therefore, it is an object of the present invention is to provide a wiper device having a driving mechanism which is so small as to be received even within a substantially small internal space of a mirror casing of a rear-view mirror provided at the exterior of the vehicle body.

Another object of the present invention is to provide a wiper device including an electrical switching means for switching motion of a wiper blade between the first and second directions, which switching means does not include mechanical elements.

To accomplish the above-mentioned and other objects, there is provided a wiper device, according to the present invention, which includes a driving means of the wiper blade for alternately driving the latter in first and second directions. The driving means comprises an electric circuit which includes a switching means and a means for detecting both ends of the wiper blade motions in the first and second directions. The switching means is operative to switch the connection of an electric power supply to an electric motor when the detecting means detects the end of wiper blade motion.

The other objects and advantages sought in the invention will be made clear from the hereinafter given detailed description of the invention in term of the preferred embodiment.

BRIEF DESCRIPTION OF THE DRAWINGS

The present invention will become more fully understood from the detailed description given below, and from accompanying drawings of the preferred embodiments of the present invention, which, however, are not to be taken limitative of the present invention in any way, but are for the purpose of elucidation and explanation only.

In the drawings.

DESCRIPTION OF THE PREFERRED EMBODIMENT

Figure 1:
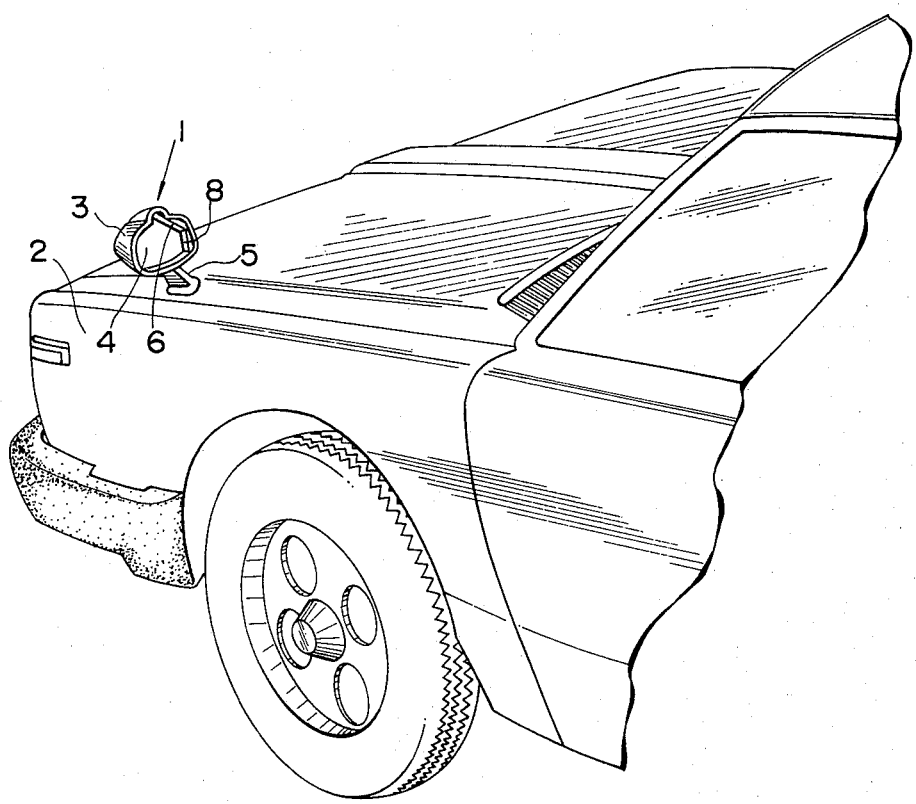
FIG. 1 is a perspective view of a front portion of an automotive vehicle with a rear-view mirror mounted on a fender portion thereof, in which the rear-view mirror is provided with a wiper device according to the present invention.

Referring now to the drawings, particularly to FIG. 1, there is illustrated a front portion of an automotive vehicle. A rear-view mirror 1 is mounted on a fender 2 of the vehicle body. The rear view-mirror 1 comprises a mirror casing 3, a mirror 4 received within the casing and a support 5 mounting the mirror casing at the top thereof and secured to the fender 2. To the mirror casing 3, a wiper arm 6 is rotatably secured. The wiper arm 6 is incorporated with a driving circuit 7 (shown in FIGS. 2 and 4) received within the mirror casing 3. A wiper blade 8 is pivoted at the free end of the wiper arm 6 so that it can sectorially move on the mirror to wipe or sweep the rain thereof. The wiper blade 8 is normally positioned at the inner end of the mirror so that it may not interfere with the rear side view.

Figure 2:
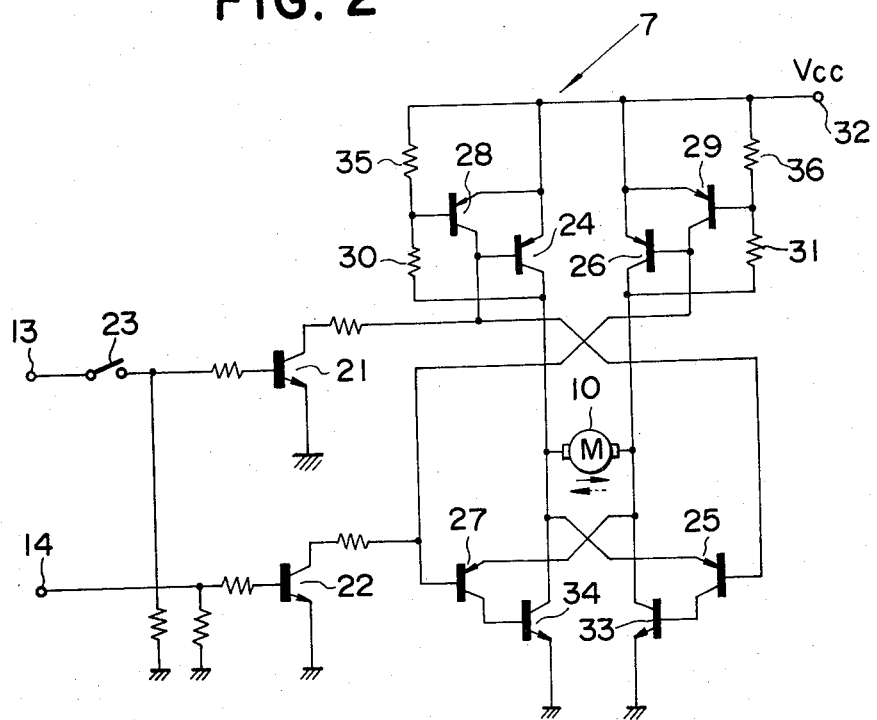
FIG. 2 is a circuit diagram of a driving circuit for the wiper device according to the present invention.

FIG. 2 shows one embodiment of a driving circuit 7 for driving the wiper device. The driving circuit 7 includes an electric motor 10 which is connected with the wiper arm 6 through a differential gear device (not shown).

Figure 3:
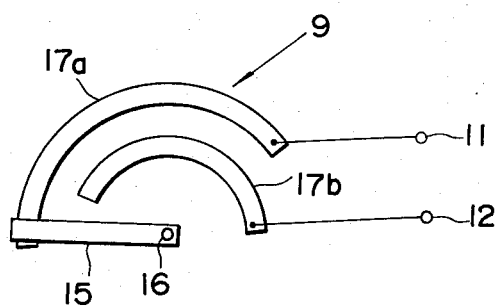
FIG. 3 is a schematic illustration of a means for detecting both ends of wiper blade motion in first and second directions to be employed in the one embodiment of the wiper device of the present invention shown in FIG. 2.

A means 9 for detecting both ends of wiper motion, as shown in FIG. 3, is connected with the driving circuit 7 of FIG. 2. Namely, terminals 11 and 12 of the wiper motion ends detecting means 9 are connected with terminals 13 and 14 of the driving circuit 7. A rotatable element 15 is mounted on an axle 16 coaxially with the wiper arm 6 so that it can be driven together with the latter. Mating to the rotatable element 15, arch shaped contacts 17a and 17b are provided. The rotatable element moves sectorially about the axle 16, together with the wiper arm 6, in sliding relationship with the contacts 17b and 17b. The contacts 17a and 17 have overlapped portions overlapping one another. The rotatable element 15 is made of electrically conductive material so that an electric power supply voltage $V_{cc}$ is applied to the arch shaped contacts 17a and 17b therethrough while it contacts each or both of the contacts.

The terminals 13 and 14 are respectively connected with base electrodes of switching transistors 21 and 22. Between the terminal 13 and the transistor 21, a driving switch 23 is interposed. The collector electrodes of the transistors 21 and 22 are connected to base electrodes of transistors 24 and 25 and base electrodes of transistors 26 and 27, respectively. The transistors 24 to 27 are of P-N-P type transistors. The collector electrodes of the transistors 24 and 26 are connected with base electrodes of the transistors 28 and 29 through bias resistor 30 and 31. The emitter electrodes of the transistors 24, 26, 28 and 29 are connected to a power source at terminal 32 and therefore, are applied an electric voltage $V_{cc}$. On the other hand, the collector electrodes of the transistors 25 and 27 are connected with base electrodes of transistors 33 and 34. Also, the collector electrodes of the transistors 24 and 26 are connected with the collector electrodes of the transistors 33 and 34.

In FIG. 2, reference numerals 35 and 36 denote bias resistors which are respectively incorporated with the bias resistors 30 and 31 so that either one of coupled bias resistors 30 and 35 or 31 and 36 bias the corresponding transistor 28 or 29.

Now, by turning on the drive switch 23, voltage $V_{cc}$ is applied to the rotatable element 15 of the means 9 for detecting both ends of wiper motion in first and second direction. Through the element 15 and the arch shaped terminal 17a, voltage $V_{cc}$ is applied to the base electrodes of the transistor 21 to turn on the same. In response to turning on of the transistor 21, the transistors 25 and 28 turn on. As a result of the transistor 28 turning on the transistor 24 also turns on. Likewise, by turning on of the transistor 25, the transistor 33 also turns on. As the result, current from power supply $V_{cc}$ flows through the transistor 24, the motor 10 and the transistor 33 to drive the motor 10 in the first direction.

The rotation of the motor 10 is transmitted to the axle 16 through the differential gears to drive the axle 16 in clock wise direction in FIG. 3. The wiper arm 6 is thereby driven in a clockwise direction by the axle 16 in FIG. 1. The wiper arm 6 is thus rotated clockwise. At the same time, the rotatable element 15 is also rotated clockwise while maintaining contact with the contact 17a, according to the rotation of the axle 16. By rotating clockwise, the rotatable element 15 contacts the other arch shaped contact 17b. Therefore, voltage $V_{cc}$ is also applied to the contact 17b and to the transistor 22 to turn on the latter. The voltage on the base electrode of the transistor 27 thus drops in response to turning on of the transistor 22. However, at this time, since the voltage applied to the emitter electrode of the transistor 27 is maintained approximately zero by the on condition of the transistor 33 and therefore grounding the power applied thereto, the transistor 27 is kept in a cut off condition. With transistor 33 on, the collector voltage of transistor 26 is approximately at ground and the emitter is at the power supply voltage $V_{cc}$. On the other hand, since the voltage on the base electrode of the transistor 29 is biased by the bias resistors 31 and 36, the transistor 29 attains the on condition in response to turning on of the transistor 22. By further clockwise rotation of the axle 16, the rotatable element 15 releases the arch shaped contact 17a, and thereby supply of power $V_{cc}$ to the transistor 21 is eliminated to turn that transistor off. In response to turning off of transistor 21, the transistors 24, 25 and 33 also turn off. On the other hand, responsive to turning on of the transistor 22 and turning off of the transistor 33, the transistor 27 attains the on condition. By turning on transistor 27, the transistor 34 is also turned on. At this time, the transistor 29 is cut off by turning on of the transistor 26. Thus, power supply $V_{cc}$ flows through the transistor 26, motor 10 and transistor 34, and thereby, the motor is driven in a second direction which is opposite to the first direction. By driving of the motor 10, the axle 16 rotates in the second direction, e.g. counterclockwise in FIG. 3. Therefore, the wiper arm 6 and the rotatable element 15 rotate counterclockwise to sectorially move the wiper arm 6 counterclockwise in the drawings. The rotatable element 15 is thus rotated together with the axle 16, while maintaining contact with the contact 17b, to contact the arch shaped contact 17a again. Similarly to the foregoing function described with respect to turning on of the transistor 22, the transistor 21 turns on by contacting the rotatable element 15 and the arch shaped contact 17a and thereby applying power $V_{cc}$ thereto. At this time, the transistors 24, 25 and 33 are maintained in cut off position by keeping the transistors 26 and 34 in an on condition. By further rotating, the rotatable element 15 releases contact with the arch shaped contact 17a. Thus, the transistors 22, 26 and 34 turns off and transistors 24, 25 and 33 turn on to return to the same condition as the first stage of the wiper operation. Thus, as the above-described operation is separated, the wiper moves in the first and second directions, alternately and repeatedly.

Now, if the driving switch 23 is turned off while the rotatable element 15 is in contact with the arch shaped contact 17a, transistor 21 can not be supplied power from supply $V_{cc}$ and thereby turns off to turn the transistors 24, 25 and 33 off. On the other hand, power is still applied to transistor 22 through the rotatable element 15 and the arch shaped contact 17b. Therefore, even when the axle 16 is rotated clockwise together with the wiper arm 6 and the rotatable element 15, in response to turning the driving switch 23 off, power $V_{cc}$ is supplied through the transistor 26, the motor 10 and the transistor 34 to reverse the driving direction of the motor. Thus, the rotatable element 15 with the wiper arm 6 rotates counterclockwise until the rotatable element is released from the arch shaped contact 17b. By releasing the rotatable element 15, the transistor 22 is cut off from the power supply and thereby the transistors 26, 27 and 34 are also turned off. At this time, since the transistor 21 is cut off from the power supply by the open switch 23, reversal driving of the wiper is not carried out.

It should be appreciated that, in the above discussed embodiment, the inner side of the rear-view mirror corresponds to the left side of FIG. 3.

Figure 4:
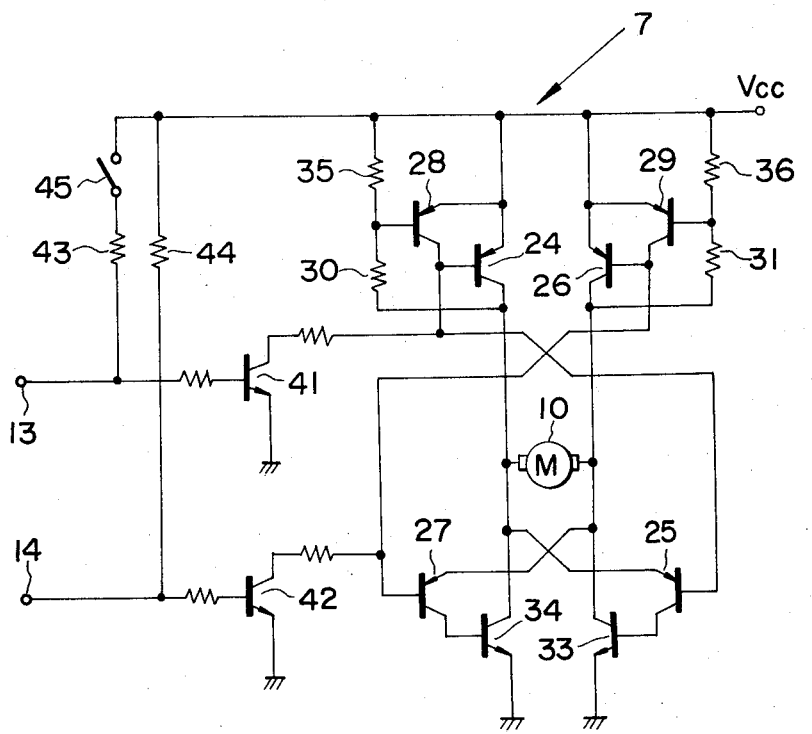
FIG. 4 is a circuit diagram of another embodiment of the driving circuit for the wiper device according to the present invention.
Figure 5:
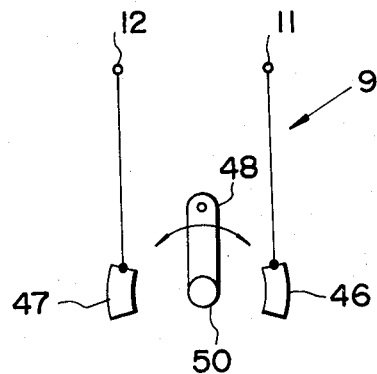
FIG. 5 is a schematic illustration of a means for detecting both ends of blade motion in first and second directions to be employed in the wiper device according to the embodiment of the present invention shown in FIG. 4.

Referring to FIGS. 4 and 5, there are shown another embodiments of a driving circuit for the wiper and a means for detecting both ends of wiper motion. In the shown embodiment, the elements having the same functions with the preceeding embodiment will be represented by the same reference numerals for simplification of and avoidance of confusion in the disclosure given hereafter. As shown in FIG. 4, the power supply $V_{cc}$ is connected with switching trransistors 41 and 42 through bias resistors 43 and 44. A wiper driving switch 45 is interposed between the power supply and the bias resistor 43. To the input terminals 13 and 14, terminals 11 and 12 are connected. Contacts 46 and 47 are thus respectively connected with the switching transistors 41 and 42. A rotatable element 48 is secured to an axle 50 coaxial with the wiper arm 6, and incorporated with the wiper arm 6 so that it can be driven together therewith. The rotatable element 48 is of electrically conductive material and is grounded by a known suitable manner (not shown). When the rotatable element 48 contacts either one of the contacts 46 or 47, the power from supply $V_{cc}$ supplied through the bias resistor 43 or 44 to the transistor 41 or 42 is grounded therethrough. Thus, the voltage on the base electrode of the transistor 41 or 42 connected with the rotatable element 48 is reduced to approximately zero.

Upon turning on of the driving switch 45, the rotatable element 48 is positioned so as to connect to the contact 47. In response to driving switch 45 turning on, power from $V_{cc}$ is applied to the base electrode of the transistor 41 through bias resistor 43 to turn on the same. By this, action similarly to the preceeding embodiment, the transistors 24, 25 and 33 are turned on. Thus, power $V_{cc}$ flows through the transistor 24, the motor 10 and the transistor 33 to rotate the wiper arm 6 together with the rotatable element 48 clockwise in FIG. 5.

At this time, power from supply $V_{cc}$ applied through the bias resistor 44 is grounded through the contact 47 and the rotatable element 48, thereby to turn off the transistor 42. Therefore, the transistors 26, 27 and 34 are maintained in off conditions. Upon rotation of the wiper arm 6 and the rotatable element 48, the rotatable element 48 breaks the connection 47. Accordingly, power from supply $V_{cc}$ is apppplied both to the transistors 41 and 42 and transistor 42 is turned on thereby. At this time, since the voltage of the emitter electrodes of the transistors 26 and 27 is approximately zero, the transistors 26 and 27 are maintained off in spite of the turning on of transistor 42. Thus, power from supply $V_{cc}$ continues to flow through the transistor 24, the motor 10 and the transistor 33 until the wiper blade reaches the end of its motion thereby causing rotatable element 48 to contact the contact 46. When the rotatable element 48 contacts contact 46, power applied to the transistor 41 is grounded, thus turning the transistor 41 off. In response to turning off of the transistor 41, the transistors 24 and 25 turn off. Therefore, the transistors 26, 27 and 34 turn on. In response thereto, power from $V_{cc}$ flows through the transistor 26, the motor 10 and the transistor 34, to drive the motor in the second direction opposite to the first direction. In response to the switching of driving direction of the motor 10, the wiper arm 6 and the rotatable element 48 rotate counterclockwise. The motor 10 continues driving in the second direction until the rotatable element 48 reaches contact 47. By repeating the above-mentioned switching operation, the wiper can be driven in first and second directions alternately.

If the driving switch 45 is turned off while the wiper arm 6 and the rotatable element 48 rotate in the first direction, the transistor 41 responsively becomes inoperative thereby to turn off the transistors 24, 25 and 33.

At this time, the transistor 42 is also turned off by aplying the power $V_{cc}$ but the transistors 26, 27 and 34 are maintained in a off condition by keeping the emitter voltage approximate zero. In response to turning off of the transistors 24 and 25, the transistors 26, 27 and 34 turn on to permit power from supply $V_{cc}$ flow through the transistor 26, the motor 10 and the transistor 34 to drive the motor in the second direction. Thus, the wiper arm 6 and the rotatable element 48 rotate counterclockwise until the rotatable element makes electrical contact with the contact 47. When the rotatable element 48 makes contact with the contact 47, power from $V_{cc}$ applied to the transistor 42 is grounded through the rotatable element 48 and the contact 47 to stop the wiper motion.

It will be appreciated that in the illustrated embodiment, the left side of FIG. 5, namely, the position where the contact 47 is located, corresponds to the inside of the rear-view mirror.

Thus, the present invention can fulfill all of the objects and advantages sought thereof.

While the present invention has been shown and described in detail with respect to the preferred embodiments, it should not, however, be considered as limited to those embodiments or to any other embodiments. Further, variations could be made to the form and the details of any parts of elements, without departing from the principle of the invention.

What is claimed is:

1. A wiper device comprising:
   a wiper blade;
   a wiper arm supporting said wiper blade at one end thereof;
   a driving means being reversible to drive in first and second directions and connected to said wiper arm so that it can alternately drive said wiper arm in first and second directions;
   a control circuit connected to said driving means, said control circuit including a switching means for switching a connection of an electric power supply between first and second circuit connections so as to alternately drive said driving means in said first and second directions; and
   a wiper position detecting means for detecting both of predetermined ends of wiper motion in first and second directions, said wiper position detecting means being connected to said switching means so that when said wiper position detecting means detects said end of wiper motion in said first direction, said switching means switches the connection of the power supply from the first connection to the second connection and when said wiper position detecting means detects said end of wiper motion in said second direction, said switching means switches the connection of the power supply from the second connection to the first connection, said wiper position detecting means including a rotatable element connected to said wiper arm in order to rotate in first and second directions corresponding to said wiper motion and a pair of contacts connected to said switching means of said control circuit and defining both ends of motion of said rotatable element, the first contact of said contacts being located to detect the end of wiper motion in said first direction and the second contact being located to detect the end of wiper motion in said second direction, said rotatable element including an electrically conductive member connected for receiving applied electric potential so that it can alternately apply an electric potential to either one of said contacts for activating said switching means to switch the connection of supplied power between the first connection and the second connection.

2. A wiper device for a rear-view mirror provided exterior of a vehicle component of an automotive vehicle comprising:
   a wiper blade;

a wiper arm supporting said wiper blade at one end thereof;

a driving means being reversible to drive in first and second directions and connected to said wiper arm so that it can alternately drive said wiper arm in first and second directions;

a control circuit connected to said driving means, said control circuit including a switching means for switching a connection of an electric power supply between first and second circuit connections so as to alternately drive said driving means in said first and second directions; and a wiper position detecting means for detecting both of predetermined ends of wiper motion in first and second directions, said wiper position detecting means being connected to said switching means so that when said wiper position detecting means detects said end of wiper motion in said first direction, said switching means switches the connection of the power supply from the first connection to the second connection and when said wiper position detecting means detects said end of wiper motion in said second direction, said switching means switches the connection of the power supply from the second connection to the first connection, said wiper position detecting means including a rotatable element connected to said wiper arm in order to rotate in first and second directions corresponding to said wiper motion and a pair of contacts connected to said switching means of said control circuit and defining both ends of motion of said rotatable element, the first contact of said contacts being located to detect the end of wiper motion in said first direction and the second contact being located to detect the end of wiper motion in said second direction, said rotatable element including an electrically conductive member connected for receiving applied electric potential so that it can alternately apply an electric potential to either one of said contacts for activating said switching means to switch the connection of supplied power between the first connection and the second connection.

3. A wiper device as set forth in claims 1 or 2, wherein said rotatable element is connected to ground in order to alternately ground either one of said contacts to activate said switching means to switch the connection of supplied power between the first and second circuit connections.

4. A wiper device as set forth in claims 1 or 2, wherein:

said switching means of the control circuit comprises first and second transistors, each of said transistors being connected to said wiper position detecting means so that each of said transistors can be switched between an on condition and an off condition in response to detection of the end of wiper motion by said wiper position detecting means, said first and second transistors alternately being turned on to permit flowing of power therethrough in first and second circuit connections to drive said driving means in first and second directions.

5. A wiper device as set forth in claim 4, wherein said rotatable element is connected to receive electric power so that it can alternately apply electric power to either one of said first and second transistors through said contacts to turn one of said transistors on.

6. A wiper device as set forth in claim 4, wherein said rotatable element is connected to ground in order to alternately ground power applied to either one of said first and second transistors so that it may turn off one of said first and second transistors to switch the connection of supplied power.

7. A wiper device for wiping rain or cleaning dust on a mirror surface of a rear-view mirror provided externally of an automotive vehicle, said wiper device including a wiper blade, a wiper arm supporting said wiper blade at one end thereof and urging said wiper blade onto said mirror surface and an electric driving means reversibly driving said wiper arm in order to sectorially move said wiper arm together with said wiper blade alternately in first and second directions, wherein the improvement comprises:

a control circuit having switching transistors connected in the relationship that either one of said transistors turns on to alternately drive said driving means in said first and second directions; and a wiper position detecting means for detecting both ends of wiper motion in said first and second directions, said wiper position detecting means comprising a rotatable element connected to said wiper arm, to sectorially move together with said wiper arm, and a pair of arch-shaped contacts located in opposing relationship so that they define both ends of the wiper motion, each of said contacts being connected to one of said transistors so that electrical power flowing therethrough switches said transistor between on and off conditions when said rotatable element reaches the predetermined end of wiper motion, said arch-shaped contacts being sufficiently long to form an overlapped portion intermediate between positions thereof corresponding to both predetermined ends of the wiper motion.

8. A wiper device as set forth in claim 7, wherein said rotatable element is coaxially secured on an axle of said wiper arm and said axle is driven by said driving means through a differential gear in the first and second directions alternately.

9. A wiper device as set forth in claims 7 or 8, wherein said rotatable element is comprised of electrically conductive element and is applied to electric power which is applied either one of said switching transistor through one of said contacts contacting therewith so that it turns said transistor on.

10. A wiper device as set forth in claim 7 or 8, wherein said rotatable element is grounded so that it can turn off one of said transistors connected to one of said contacts which is contacted by said rotatable element.

* * * * *